Nov. 2, 1926.

H. K. LORENTZEN 1,605,120

AUTOMOBILE HEADLIGHT CONTROLLER

Filed June 9, 1922   3 Sheets-Sheet 1

Inventor
Hans K. Lorentzen
By his Attorney
Frank J. Kent

Nov. 2, 1926.  1,605,120
H. K. LORENTZEN
AUTOMOBILE HEADLIGHT CONTROLLER
Filed June 9, 1922    3 Sheets-Sheet 2
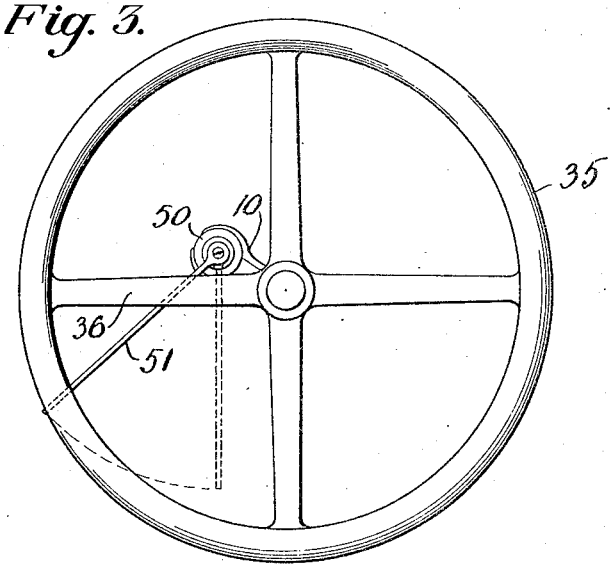
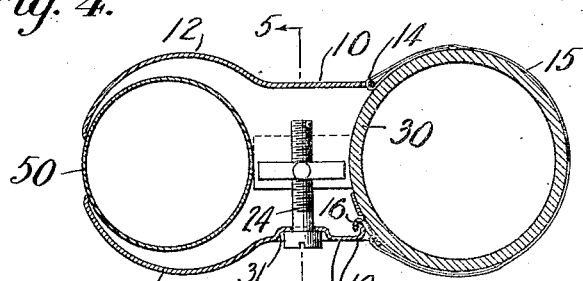
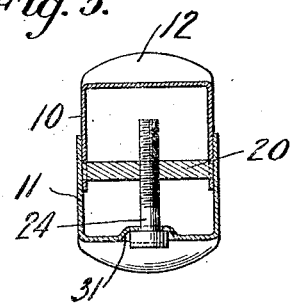
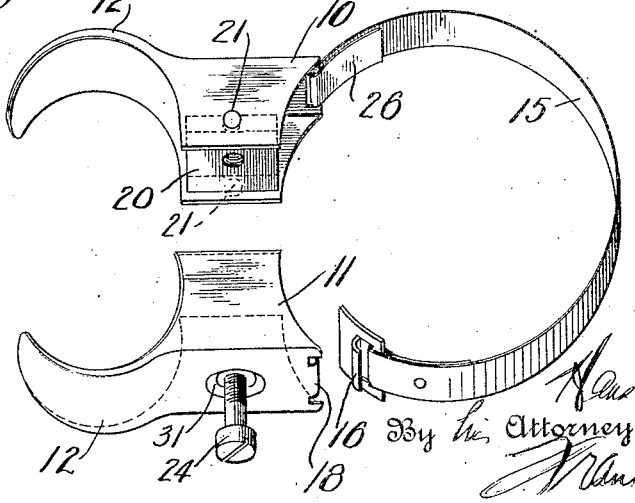

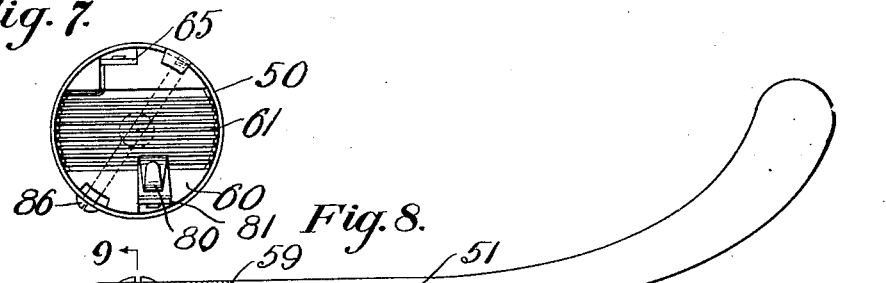

Patented Nov. 2, 1926.

1,605,120

UNITED STATES PATENT OFFICE.

HANS K. LORENTZEN, OF NEW YORK, N. Y.

AUTOMOBILE HEADLIGHT CONTROLLER.

Application filed June 9, 1922. Serial No. 567,072.

This invention relates to locking devices, fastening devices and brackets, whereby one article is mounted upon or supported by another article. More particularly, this invention has for its object the provision of a fastening device whereby an article may be readily and firmly mounted upon a round support, such as the steering casing of an automobile.

A further object is the provision of a fastening device whereby a round object may be readily and firmly mounted upon a round support or upon a support of any cross-section.

A further object is the provision of a fastening device whereby one article may be attached to another article and which is capable of being applied to articles of various sizes and cross-sections.

A further object is the provision of a fastening device for mounting one article upon another and which is composed of few parts, has a powerful locking effect, cannot become accidentally disengaged, and may be readily attached or detached.

A further object is the provision of a fastening device whereby a control device may be mounted upon an automobile steering casing adjacent the steering wheel so as to be readily operated by the driver of the vehicle.

A further object is the provision of a novel electrical control device which facilitates the control of an electric system, such as the lighting system of an automobile.

A further object is the provision of an electric light-control device whereby an infinite number of variations in the intensity of the lights of a system may be obtained.

A further object is the provision of an electric light-control device for automotive vehicles so constructed and so mounted that it can be easily operated by the driver of the vehicle.

Other objects and aims of the invention, more or less broad than those stated above, together with the advantages inherent, will be in part obvious and in part specifically referred to in the course of the following description of the elements, combinations, arrangements of parts, and application of principles constituting the invention; and the scope of protection contemplated will appear from the claims.

In the accompanying drawings, which are to be taken as part of this specification, and in which I have shown merely a preferred embodiment of this invention, Fig. 1 is a plan view showing my novel light-control device mounted upon the steering casing of an automotive vehicle by means of my novel fastening device.

Fig. 3 is a view similar to Fig. 1 but with the fastening device and the article supported thereby occupying a different position.

Fig. 4 is a horizontal sectional view of the fastening device.

Fig. 5 is a section taken on the line 5—5 of Fig. 4.

Fig. 6 is a perspective view of the fastening device.

Fig. 7 is a plan view of my novel control device, with parts removed to expose the interior.

Fig. 8 is a front view of the control device, partly sectioned to expose the interior.

Fig. 9 is a section taken on the line 9—9 of Fig. 8.

Fig. 10 is a section taken on the line 10—10 of Fig. 8.

Fig. 11 is a section taken on the line 11—11 of Fig. 8.

Figure 1:
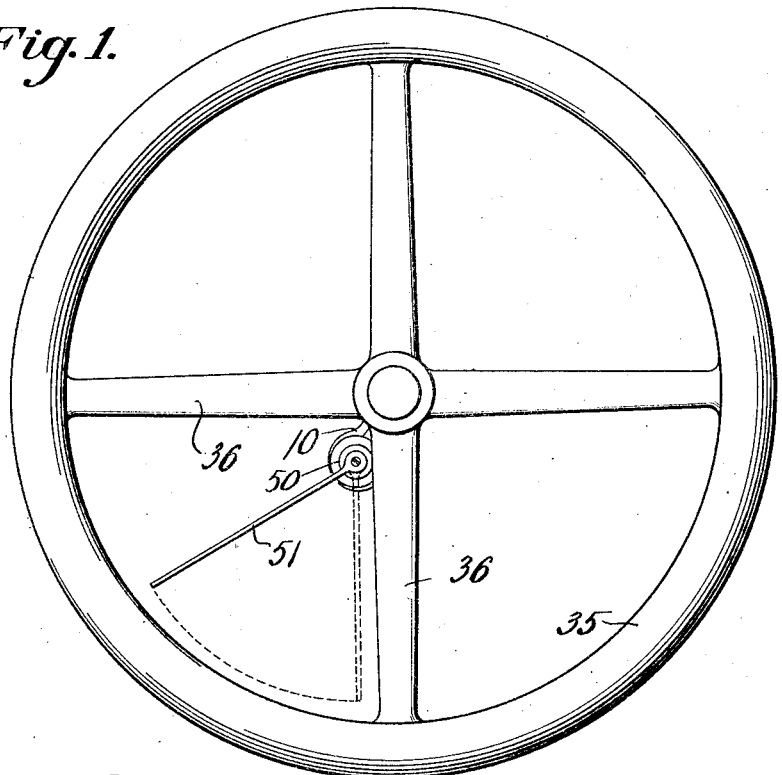
Figure 2:
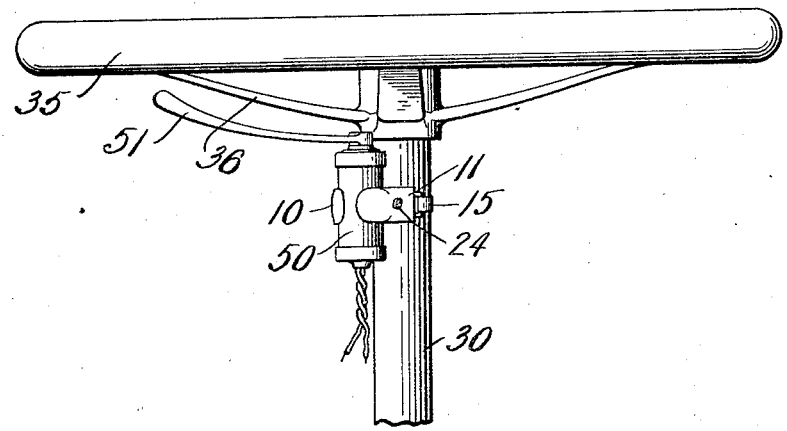
Fig. 2 is a front elevation of the devices shown in Fig. 1.

Referring to Figs. 1 to 6, I have illustrated my novel fastening device employed for fastening a control device to the steering casing of an automotive vehicle. It is to be understood that this is merely for the purpose of illustrating one convenient use to which the fastening device can be put, and that as the description proceeds it will be apparent that the device may be employed to fasten a vast variety of articles to an equally wide variety of other articles and supports.

The fastening device comprises essentially two fastening members 10 and 11 (see Fig. 6), each having a gripping member 12 preferably formed integral therewith for engaging opposite sides of the article to be supported, said fastening members being mounted for both pivotal and linear movement relative to each other. Preferably the gripping members or jaws 12 are formed with concaved inner surfaces, as shown, for gripping a round object, but it will be understood that the shape of these surfaces may be varied to correspond to the shape of the particular objects to be supported. If desired, a jaw 12 may be provided at each end of each member 10, 11, but in the present instance one of said fastening members (here shown as member 10) is provided at its other end with an eye 14 to which a flexible band 15 may be attached. The flexible band is adapted to encircle another object or support and carries a hook 16 at its other end for attachment to a catch 18 on the other end of member 11. The flexible band facilitates attachment to a support of round or any other cross-section.

To facilitate adjustment of the fastening device about the supporting article, and also the supported article, it is essential that the fastening members be connected to each other, as hereinbefore stated, to permit pivotal movement, so that the gripping jaws 12 may be spread apart to permit insertion of the article therebetween, and also linear movement so that they may be drawn together for fastening or moved apart for unfastening. For this purpose the members 10 and 11 are so formed that they slide one within the other, in this case member 11 telescoping over member 10. The inner member 10 has mounted therein a nut 20 having ears 21 journaled in the upper and lower plates of said member for pivotal movement about a vertical axis. A screw 24 passes horizontally through an opening in the side of member 11 and engages in nut 20. It will be apparent that member 11 as a whole may now be swung about member 10 in a horizontal plane, since the nut turns with screw 24 and member 11 about the vertical axis through ears 21, or member 10 may be swung relatively to member 11, the nut being held by screw 24 fixed relative to member 11 while member 10 turns about ears 21. Since the screw 24 passes freely through the opening in member 11, the fastening members may be moved in linear direction relative to each other, and at the same time they may be rotated about ears 21 for pivotal movement relative to each other.

By sliding member 10 outwardly from member 11 and by turning the fastening members about the pivotal axis through ears 21, the jaws 12 are spread open so that an article may be inserted therebetween. In the present case the control device 50 is inserted between said jaws. The members are then swung to close the jaws about the article. At the same time, flexible band 15 has its free end drawn through the eye 14 and the surplus portion thereof is bent sharply back upon itself on the inside. The rest of the band, which is made just sufficient to encircle the support, in this case the steering casing 30, is drawn around the support, and hook 16 is applied to catch 18 on member 11. Screw 24 is now screwed inwardly to draw the nut and member 10 into member 11. Jaws 12 are thus drawn together and clamped firmly around control device 50, and the eye 14 and catch 18 are moved together to draw band 15 tightly around the support. When the head of screw 24 lodges firmly in the countersunk seat 31 no further movement of the parts is possible.

It will be understood that either the band 15 or the jaws 12 may be applied to the support while the other is applied to the article to be supported. An efficacious fastening device is thus obtained by my invention whereby objects, especially round objects, may be fastened to each other. The flexible band 15 adapts itself to various shapes and cross-sections of articles, while the inner surfaces of jaws 12 may also be shaped to conform to any desired cross-section. This fastening device therefore has a wide range of utility.

The control device 50 is thus mounted on the steering casing adjacent the steering wheel 35 and is provided with a horizontally rotatable handle 51 which can be operated from beneath the steering wheel or between the spokes 36 thereof. By means of the fastening device hereinbefore described the control device may be adjusted in position relative to the spokes of the steering wheel so that the handle 51 is readily accessible. Thus, the fastening device may be applied to the steering casing so that the handle 51 occupies the position shown in Fig. 1 or that shown in Fig. 3 to suit the driver's convenience.

The particular use to which the control device is here applied is the control of the lights of an automotive vehicle to vary the intensity thereof from complete extinction to the full capacity of the bulbs. It will be obvious from the description that this control device may be employed wherever it is desired to control the current in an electrical system. The device 50 comprises a casing having removable top and bottom members 52, 53, the bottom members having an opening permitting conductors 54, 55 to be passed therethrough, and the top member having an opening in which is journaled a block 59 carried by said handle 51. Within the casing is positioned an insulating block 60 around which is wound in substantially parallel vertical planes a resistance coil 61, one end 64 of which is connected to a contact strip 65 to which one of the conductors is attached, as by a binding post 66. The resistance coil thus forms a flat band over the top of block 60 (see Fig. 10). Over this band a spring contact 70 sweeps. Said contact has a flat portion 71 fixed to a block 72 secured to handle 51 through block 59. Block 72 is provided with a cut-out portion 76 in which is adapted to fit a projection or stop 77 carried by the cylindrical casing (see Figs. 10 and 11). By operating said handle back and forth, block 72 is oscillated until stop 77 engages one end or the other of cut-out portion 76. The contact 70 is so positioned relative to block 72 and the cut-out portion 76 that when assembled and stop 77 engages one end of said cut-out portion, the contact 70 will engage the resistance coil near the contact strip 65. In this position the current will pass almost directly from conductor 55 and contact strip 65 to contact 70 and plate 71, without passing through any substantial portion of the resistance coil, so that the full current will be effective. The circuit is completed from contact 70 and plate 71 by a spring finger 80 fixed to a contact strip 81 and engaging said plate 71 as the handle is rotated between the limits defined by stop 77 and the cut-out portion 76. A conductor 54 is connected at a binding post 83 to the contact strip 81.

As the handle is turned to swing stop 77 from the position shown in Fig. 10 (where the current passes almost directly from contact strip 65 to the contact 70 without passing through any substantial portion of the resistance coil) to the position shown in Fig. 11, contact 70 will move over the top of the resistance coil away from contact strip 65 so that the current will pass through a constantly increasing number of loops of the resistance coil to transmit a continually decreasing amount of current, until, in the Fig. 11 position the entire resistance coil is in the circuit before reaching contact 70 so that practically no current passes. As the handle 51 moves back to the Fig. 10 position fewer coils are included in the circuit so that a constantly increasing amount of current is transmitted. It will thus be apparent that an infinite number of variations in light intensity is made possible by this device.

The light control device admits of easy assembling and disassembling. To take apart it is only necessary to remove screws 85 which hold the top and bottom members 52 and 53 to the cylindrical casing. The block 60 may be withdrawn by releasing a screw 86 passing through the casing and the block (see Fig. 7).

The above description embodies the principles of my invention and it will be obvious that various changes may be made without departing from the scope of the invention as defined in the annexed claims:

I claim:

1. A control device for controlling the current transmitted through a circuit, said device comprising a casing having an insulating block therein, a removable cap for the casing provided with an opening, a resistance coil in said casing and wound about the insulating block in substantially parallel, vertical loops, an operating member journaled in said opening and operable from the outside of the opening, and a contact carried by said operating member for including more or less of said loops in said circuit as said operating member is rotated.

2. A control device for controlling the current transmitted through a circuit, said device comprising a casing having an insulating block therein, a removable cap for the casing provided with an opening, a resistance coil in said casing and wound about the insulating block in substantially parallel, vertical loops, an operating member journaled in said opening and operable from the outside of the casing, a contact carried by said operating member for including more or less of said loops in said circuit as said operating member is rotated, and means for limiting the movement of said operating member.

3. A control device for controlling the current transmitted through a circuit, said device comprising an insulating block, contact strips fixed to said block, a resistance coil wound about said insulating block and connected at one end to one of said contact strips, and an operating member having a contact engageable with said coil to include more or less of said coil in the circuit as said member is operated, said other contact strip being in engagement with said contact carried by the operating member.

4. A control device for controlling the current transmitted through a circuit, said device comprising a casing, an insulating block in said casing, contact strips fixed to said block, a resistance coil wound upon said block and connected at one end to one of said strips, an operating member journaled in said casing and operable from the outside thereof, said operating member having a contact member fixed thereto inside of said casing and engageable with said coil to include more or less of said coil in the circuit as said operating member is operated, said other contact strip being in engagement with said contact member.

5. A control device for controlling the current transmitted through a circuit, said device comprising a casing, an insulating block in said casing, contact strips fixed to said block, a resistance coil wound upon said block and connected at one end to one of said strips, an operating member operable from outside the casing, said operating member having a contact member fixed thereto inside of said casing and engageable with said coil to include more or less of said coil in the circuit as said operating member is operated, said other contact strip being in engagement with said contact member, said casing having a detachable bottom member to permit withdrawal of said insulating block, and having a detachable cover in which said operating member is journaled.

6. A control device for controlling the current transmitted through a circuit, said device comprising a casing, an insulating block in said casing, contact strips fixed to said block, a resistance coil wound upon said block and connected at one end to one of said contact strips, an operating member journaled in said casing and operable from the outside thereof, said operating member having a contact member fixed thereto inside of said casing and engageable with said coil to include more or less of said coil in the circuit as said operating member is operated, said other contact strip being in engagement with said contact member, and means for limiting the movement of said contact member.

7. A control device for controlling the current transmitted through a circuit, said device comprising a casing, an insulating block in said casing, contact strips fixed to said block, a resistance coil wound upon said block and connected at one end to one of said contact strips, an operating member journaled in said casing and operable from outside the casing, said operating member having a contact member fixed thereto inside of said casing and engageable with said coil to include more or less of said coil in the circuit as said operating member is operated, said other contact strip being in engagement with said contact member, and means carried by said casing and engaging said operating member for limiting the movement of said operating member.

8. A control device for controlling the current transmitted through a circuit, said device comprising a casing, an insulating block in said casing, contact strips fixed to said block, a resistance coil wound upon said block and connected at one end to one of said strips, an operating member journaled in said casing and operable from the outside thereof, said operating member having a contact member fixed thereto inside of said casing and engageable with said coil to include more or less of said coil in the circuit as said operating member is operated, said other contact strip being in engagement with said contact member, and a stop carried by said casing, said operating member having a cut-out portion in which said stop engages to limit the movement of said operating member.

9. A control device for controlling the current transmitted through a circuit, said device comprising a casing having removable top and bottom members with openings therein, an insulating block within the casing, a resistance coil wound about said block in substantially parallel vertical planes, contact strips fixed to said block, one of said strips being connected at one end to one end of said coil, a rotatable contact member in the opening in said top member adapted to make contact with said coil to include more or less of said coil in the circuit as said rotatable member is operated, said other contact strip being in engagement with the rotatable member and conductors in the opening in said bottom member connected to said strips.

10. A control device for controlling current transmitted through a circuit, said device comprising a casing having removable top and bottom members with openings therein, an insulating block within the casing, contact strips secured to said block, a resistance coil wound about said block, one of said strips being connected at one end to one end of said coil, a rotatable contact member adapted to make contact with the resistance coil to include more or less of said coil in the circuit as said member is operated, said other contact strip being in engagement with the rotatable member, and means for limiting the movement of the rotatable member.

11. A control device for controlling current transmitted through a circuit, said device comprising a casing having top and bottom members with openings therein, an insulating block within the casing, contact strips secured to opposite sides of said block in substantially aligning relation to each other, a resistance coil wound about said block, one of said strips being connected at one end to one end of said coil, a rotatable member in the opening of the top member having a contact on the underside thereof engageable with the resistance coil to include more or less of said coil in the circuit as said rotatable member is operated, said other contact strip being in engagement with the rotatable member, said rotatable contact when in a position nearest one of the contact strips permitting current to pass through the casing without passing through any substantial portion of the resistance coil.

12. A control device for controlling current transmitted through a circuit, said device comprising a casing having removable top and bottom members with openings therein, an insulating block within the casing having a resistance coil wound thereabout, a rotatable member in the opening in the top member having a contact plate with a contact finger on the underside thereof, contact strips secured to said insulating block, one of said strips having a contact finger at one end engageable with said contact plate, said other contact strip being connected at one end to one end of said coil, said rotatable contact finger engageable with the resistance coil to include more or less of said coil in the circuit, and conductors connected through the bottom opening to the other end of said strips.

13. An automobile headlight dimmer unit comprising in combination, a casing having a removable cap provided with an opening, an insulating core in said casing, a resistance coil wound lengthwise on said core, and a variable contact device for the coil journaled in said opening adjacent to one end of said core.

14. An automobile headlight dimmer unit having, in combination, a casing having a removable cap provided with an opening, an insulating core fixed in said casing, a resistance coil wound lengthwise on said core, and a rotatable contact for said coil journaled in said opening and acting on the coil at one end of the core.

15. An automobile headlight dimmer unit having, in combination, a casing having a removable cap provided with an opening, a resistance element fixed in said casing, a contact device journaled in said opening and rotatable in said casing and insulated therefrom and arranged to contact said resistance element externally thereof, and a terminal brush fixed in said casing contacting said rotatable contact device.

16. An automobile headlight dimmer unit having, in combination, a casing having a removable cap provided with an opening, a fixed resistance coil in said casing, a fixed terminal brush in said casing, said coil and said brush presenting contact surfaces at one end of the casing, a removable cap for the adjacent end of the casing having an opening therein, and a contact device rotatably secured in the opening in said cap and in electrical connection with said coil and said fixed terminal brush.

17. An automobile headlight dimmer unit having, in combination, a casing having a removable cap provided with an opening, a resistance coil fixed in said casing, a variable contact device in said opening beyond the coil, said device being rotatable axially of the casing, and a lever rigid with said contact device whereby adjustment of the dimmer is controlled by the lever.

18. An automobile headlight dimmer unit having, in combination, a casing, a fixed resistance coil therein, a variable contact member coacting with said coil and rotatably mounted in one end of said casing axially thereof, a disk rigid with said member having projecting parts thereon, and a projection rigid with the casing to engage with said projecting parts of the disk whereby the arc of rotation of said contact member is limited.

19. An automobile headlight dimmer unit having, in combination, a casing, an insulating core fixed therein, a channel lengthwise about said core, a coil of resistance material wound thereon lengthwise of the core within said channel, other channels lengthwise of the core, conductor bars in said channels, one of said bars being a terminal for the coil, the other bar having a brush member thereon, a movable contact device in the end of said casing having variable contact with the wires of the coil, and means to insulate said device from the casing, said brush member having continuous contact with said contact device.

20. An automobile headlight dimmer unit, having, in combination, a cylindrical casing, end caps therefor, a resistance coil unit therein fitting the casing, means to secure the coil unit fixed within the casing, the coil having bared wires presented at one end of the casing, leading in wires through one cap, connector bars rigidly associated with the coil unit, insulated from the casing and connected one to each leading in wire, a contact device in the other cap comprising a member pivotally movable therein, an external lever rigid with said contact device, to operate the device outside of the casing, an insulating disk also rigid with said device inside the casing, a resilient metal finger secured on said disk to contact said bared wires of the coil, and a brush member on one of said bars to contact the metal of the finger.

21. A rheostat controller for headlights comprising a tubular metal member; a cap secured to each end of said member; a cylindrical insulating member secured within said tubular member; a plurality of turns of resistance wire formed on said insulating member, said turns being substantially parallel to the axis of the cylindrical member; means for anchoring the ends of the said wire; a contact rotatably secured to one of said caps, said contact having a spring arm adapted to contact with the turns of the resistance wire; a handle located outside of the cap and connected with the rotatable contact; a terminal electrically connected to one end of said resistance wire; and a second terminal slidably connected to the rotary contact.

22. A rheostat controller for headlights comprising a tubular metal member; a cap secured to each end of said member, each of said caps having a central opening; a cylindrical insulating member secured within the tubular member, said insulating member having a plurality of parallel longitudinal grooves on opposite sides thereof; a resistance wire wound longitudinally on said insulating member and having its turns lying in said grooves, one end of said wire being dead-ended and the other connected to an electrical terminal; an insulating disk rotatably mounted in one of said end caps; a handle connected to said disk, said handle being located on the outside of said cap and the disk on the inside; a spring contact connected to the disk, said contact having a spring arm, the end of said spring being in contact with the resistance wire; a second terminal secured to the insulating member, said last named terminal having a spring, said spring contacting with the spring contact.

In testimony whereof I affix my signature.

HANS K. LORENTZEN.